United States Patent [19]

Kurz

[11] 4,232,620
[45] Nov. 11, 1980

[54] THERMAL INSULATING MATERIAL

[76] Inventor: Milton Kurz, Pond Crossing, Lawrence, N.Y. 11559

[21] Appl. No.: 951,371

[22] Filed: Oct. 16, 1978

[51] Int. Cl.³ .......................... B32B 3/10; B32B 7/08
[52] U.S. Cl. ................................ 112/420; 428/137; 428/227; 428/920; 428/102
[58] Field of Search ............... 5/355, 361 B; 428/102, 428/162, 255, 227, 131, 137, 247; 112/420, 440, 441, 401, 402, 417, 404

[56] References Cited

U.S. PATENT DOCUMENTS

| | | | |
|---|---|---|---|
| 1,345,046 | 6/1920 | Wedlock | 5/361 B |
| 2,067,647 | 1/1937 | Potts | 428/137 X |
| 2,068,456 | 1/1937 | Hooper | 428/247 X |
| 3,332,831 | 7/1967 | Stoller | 428/162 |
| 3,707,433 | 12/1972 | Clough et al. | 428/137 |
| 3,801,420 | 4/1974 | Anderson | 428/102 |
| 4,116,743 | 9/1978 | Davis | 428/255 X |

FOREIGN PATENT DOCUMENTS

| | | | |
|---|---|---|---|
| 560900 | of 1958 | Canada | 428/159 |
| 730925 | of 1962 | Canada | 428/247 |

Primary Examiner—George F. Lesmes
Assistant Examiner—Alexander S. Thomas
Attorney, Agent, or Firm—Brumbaugh, Graves, Donohue & Raymond

[57] ABSTRACT

A thermal insulating material comprises at least two sheets of plastic film, a mesh sandwiched between adjacent film sheets and outer cover layers of mesh sandwiching the film-mesh sandwich. The film-mesh sandwich and the outer meshes are stitched together. Vapor permeability is imparted by perforations through the films.

1 Claim, 4 Drawing Figures

LEGEND:
STITCHING ———————
NEEDLE HOLES
(NO STITCHING) · · · · · ·

THERMAL INSULATING MATERIAL

BACKGROUND OF THE INVENTION

This invention relates to thermal insulating material and, in particular, to a highly efficient, lightweight, compact material based on mesh and plastic film.

One of the most efficient thermal insulation systems yet devised consists of many layers of metallized mylar film interleaved with netting and joined by thermal bonding along the edges or by rivets. The nettings serve as spacers between the film layers to keep them from touching, thus limiting heat transfer by conduction and providing space for reflection of heat. The metallized mylar reflects heat and limits heat transfer by radiation.

Apart from the relatively high technology "superinsulation" systems used in space vehicles and aircraft, thermal insulation materials based on plastic film have not been commercialized to any significant extent, even though relatively simple systems have been proposed. For example, U.S. Pat. No. 3,707,433 describes a material consisting of two layers of metallized polyethylene separated by a fiberglass scrim or a layer of plastic foam and bonded into a sandwich by adhesive or by the foam. The use of adhesive to join the layers involves problems in manufacture, notably in drying an adhesive trapped between vapor impermeable sheets. The system of that patent is generally unsuitable for high speed, low cost production for at least that reason. Moreover, the adhesive renders the product relatively rigid and, therefore, generally unsuitable for uses in which flexibility is needed, such as in clothing. It is suggested in the patent that breathability can be imparted to the material by needle punching a layer of fibers through it; in fact, the tight bundles of fibers passing through the holes significantly limit vapor transmission. The manufacturing and use problems associated with previously proposed insulating systems based on metallized films have made them uncompetitive thus far with other materials, particularly plastic foam.

SUMMARY OF THE INVENTION

The present invention provides a thermal insulating material which is relatively inexpensive to make, highly efficient, durable, vapor permeable and, if desired, flexible. Those and other characteristics make it useful in all sorts of ways ranging from clothing to construction to cryogenic containers.

According to the invention, the insulating material comprises at least two sheets of ordinary polymeric (plastic) film-i.e., there is no metal layer on the film, a mesh sandwiched between each adjacent pair of film sheets and an outer mesh on each outside face of the film-mesh sandwich. The film-mesh sandwich and the outer meshes are joined by rows of stitching—or to put it more simply, sewn together—preferably in a quilting system. The insulating material is made vapor permeable by the inherent vapor permeability of the meshes and by perforations through the films. The perforations may be created in the course of stitching by the needles that do the stitching, in which case over-sized needles are used so that the needle holes are somewhat larger than the thread going through them. Needle perforations can also be made with unthreaded (non-stitching) needles to enhance the vapor permeability provided by the stitch perforations or as the sole or predominate means of providing vapor permeability.

The thermal insulating property of the insulating material is derived from the low air and vapor permeability of the film, which minimizes heat transfer by convection, and from the fact that contact between the film layers is prevented or minimized, which reduces heat transfer by conduction. On the latter aspect, the relationship between the thickness of the mesh between the films and the size of the mesh openings is selected to keep the films from touching each other. On the other hand, the size of the mesh openings should be maximized to minimize the amount of film-mesh-film contact.

For primarily cost reasons, polyethylene film is preferred, but other plastic films, such as polypropylene, polybutylene, and polyvinyl chloride, can also be used. Generally, the film need only be of a thickness adequate to make it strong and rigid enough to support itself across the mesh openings and to endure flexing and handling. The overall strength and stability of the material is preferably derived primarily from the mesh of the film-mesh sandwich and the outer mesh layers.

Various types of meshes can be used in the insulating material, according to the invention, such as knitted, woven, or unwoven meshes formed from threads, yarns, filaments or fibers or meshes made by extrusion, or by perforating, or by perforating and expanding, plastic or non-woven webs. Preferably, to maximize the insulating factor, the materials of the meshes should have a low coefficient of thermal conductivity. Inasmuch as the meshes impart strength, stability and durability to the insulating material, durable stable meshes should be used where the end use requires, such as in apparel and some industrial applications. In many industrial applications, however, the insulating material will be united with or fitted to an object that is itself strong, and the strength, stability and durability of the insulating material need be only sufficient to endure fabricating, shipping and whatever handling occurs in use. The meshes may be either relatively stiff or flexible, as desired.

Meshes knitted from threads of synthetic fibers, such as nylon or polyester, offer certain advantages. The mesh thickness will generally be about 0.005 inch to 0.010 inch and the mesh opening size about 0.05 to 0.10 inch. The size of the opening of the mesh is selected primarily on the basis of the relative softness or stiffness of the film. The softer and more flexible the film, the smaller will be the mesh openings required to keep the film layers from touching each other through the openings, and vice versa. The thickness of the mesh and the end use of the insulating material affect the characteristic of separation of the films and should be taken into account. The mesh contributes strength, durability and stability to the material and should be selected with that in mind as well, as mentioned above.

The principal purposes of the outer meshes are (1) to contribute to the overall strength and stability of the material when required, (2) to protect the relatively fragile thin films during handling and use, and (3) to separate the film layers from any objects the insulating material may come in contact with in use and thereby minimize heat transfer between te objects and the films by conduction.

The stitching or sewing is the sole means of joining the layers of the material. Sewing is fast and easy to do on, for example, quilting machines and has none of the process and durability problems of adhesives. Moreover, the sewing step which joins the layers may also impart vapor permeability by making myriad perforations through the film sheets, as described above.

The stitching pulls the layers together along the stitching lines, which may lower the insulating factor along the stitching lines because of the increased conductivity where the layers are closer together or touch. Therefore, the spacing between the rows of stitches should be as wide as possible, generally from 2 to 10 inches, within the requirement for stable, durable uniting of the layers in the context of end use. Thus, material for garments will generally have closer spacing of the stitching for enhanced durability than refrigerator insulation, for example, which is not subject to much abuse and need be united only moderately for handling and installation and for enduring transportation.

The desired degree of vapor permeability or, as more commonly referred to with respect to materials for wearing apparel, "breathability," can be obtained by adjusting the density and size of needle perforations. If the perforations formed by sewing a stitch pattern that provides the desired uniting of the layers provide insufficient breathability, additional needle punches formed independently of stitching can be made. Stitching with small needles is entirely appropriate, in which case the holes through which the thread passes are closed and breathability can be provided by additional needle punches without stitching.

The "R" factor of the insulating material can, of course, be increased by adding additional plies to the film-mesh sandwich, subject to the limiting factor of the ability to sew the plies together.

Insulating materials according to the invention made with flexible meshes and films are thin, light in weight, durable and easy to work with, characteristics that make them ideal for cold weather clothing, especially in outerwear such as jackets, coats and skiing apparel.

The insulating material of the present invention is also useful as insulation in building materials in special situations requiring effective insulation in limited and light space areas, for example, as duct insulation or as a component of a built-up roof. More general usage is, of course, entirely feasible, but the cost per "R" value is likely to be high compared to, for example, fiberglass and plastic foam.

The high "R" value in a "small package" makes the insulating material of the present invention especially useful in insulating refrigerators, cryogenic containers, and the passenger compartments of automobiles, trucks, rail cars, airplanes, and the like. The mechanical flexibility of the material makes it easy to shape to fit many geometric shapes. It can be bonded to the walls or panels of such objects using adhesive-coated foam strips or a foam-type adhesive, preferably applied in bands or strips. Such foam systems may be used in register with the stitching of the material; the foam will mask the perforations made by sewing and thus minimize vapor permeation, if it is desirable or necessary to do so. The foam-type adhesive or foam strips maintain the insulating factor.

For a better understanding of the invention, reference may be made to the following description of exemplary embodiments.

DESCRIPTION OF EMBODIMENTS

Figure 1:
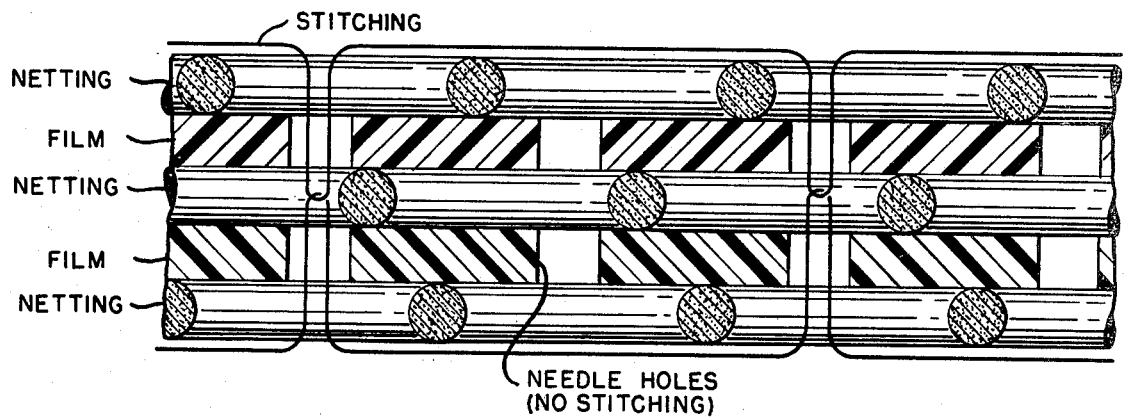
FIG. 1 is a schematic cross-sectional view of an embodiment.
Figure 2:
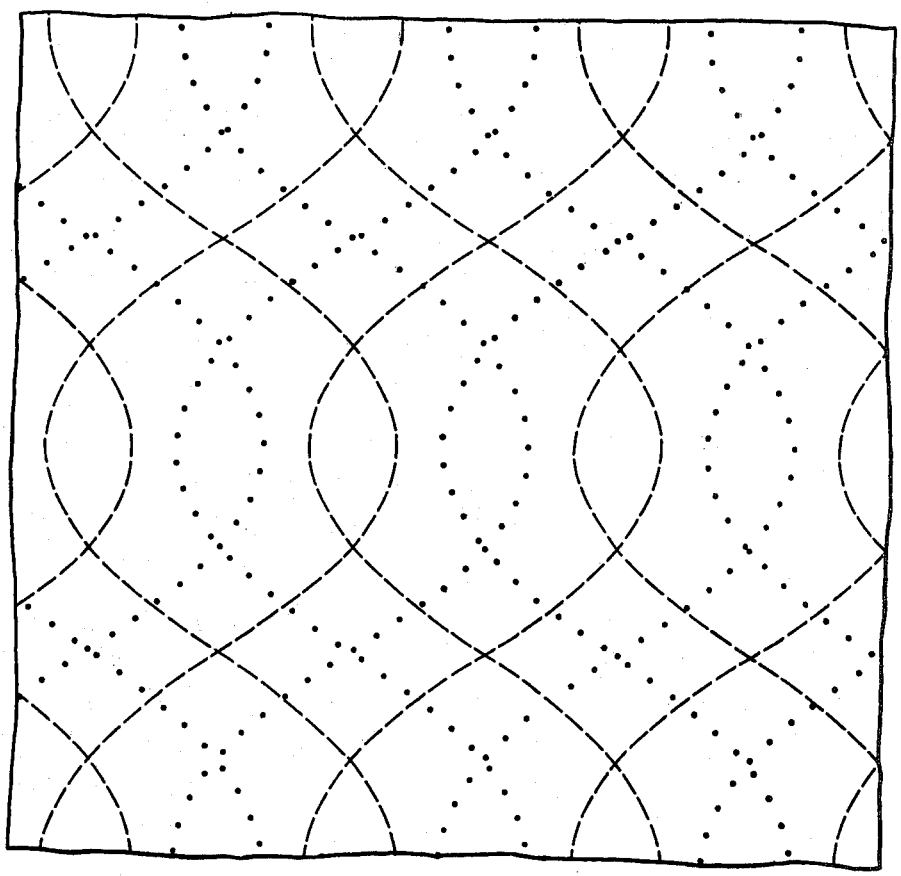
FIG. 2 is a schematic top view of the material of FIG. 1.

Both embodiments of thermal insulating material shown in the drawings comprise two sheets of 0.5 mil polyethylene film. A two-bar half-gauge knitted mesh made on a warp-knitting machine by the following formula using 15 denier nylon thread on both bars is sandwiched between the films.

Front bar 2/0 2/4 4/6 4/2

Second bar 4/6 4/2 2/0 2/4 The same meshes are used for the outer layers.

The mesh has a thickness of about 0.006 inches and openings measuring about 0.06 inches by 0.06 inches. The package is sewn together by size No. 2 nylon thread in an "S" quilting pattern with the rows four inches apart and with six stitches per inch. The stitching is made using No. 2 needles and leaves perforations in the film measuring about 0.0023 to 0.0036 inch, which is roughly four to seven diameters of the stitching thread. The breathability of the material is enhanced by rows of punches made by unthreaded No. 2 needles of the quilting machine spaced four inches apart and punching six punches per inch.

Figure 3:
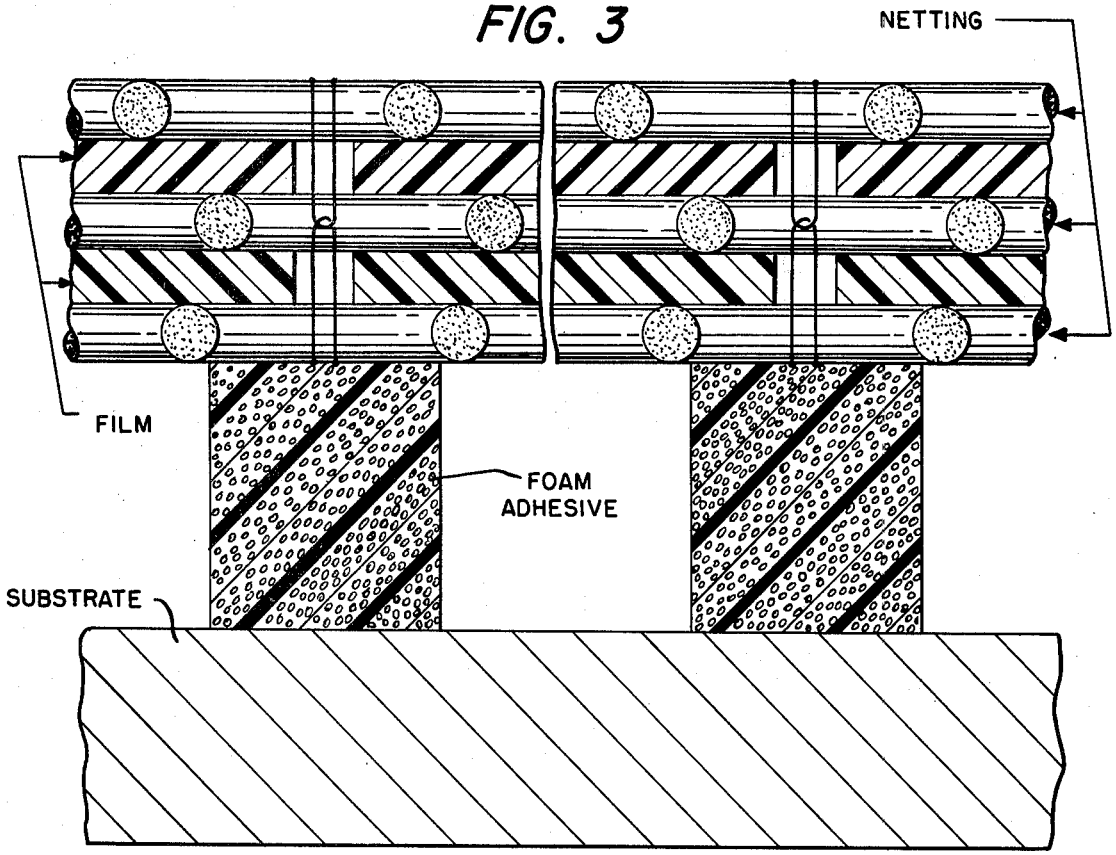
FIG. 3 is a schematic cross-sectional view of another embodiment adhered to a metal panel by foam adhesive applied in strips.
Figure 4:
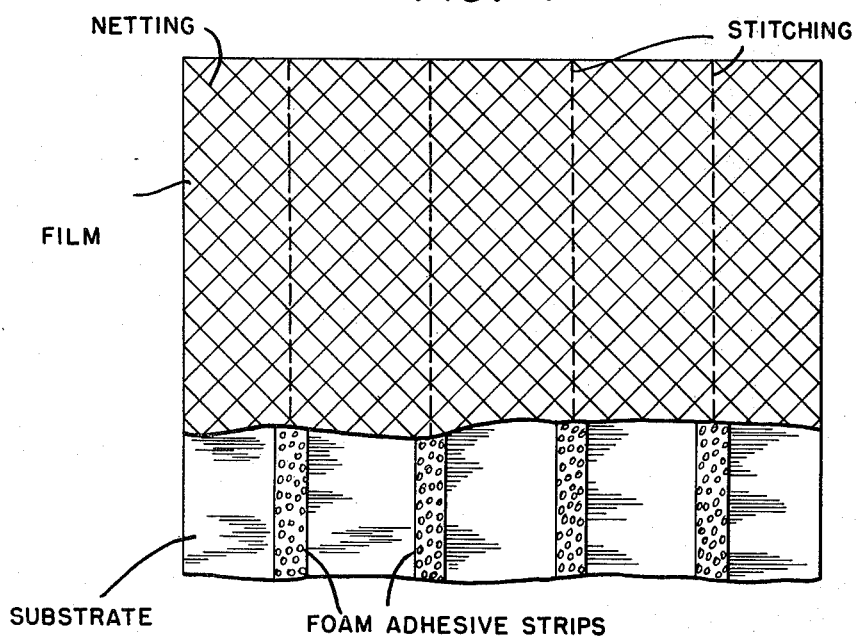
FIG. 4 is a schematic plan view of the material of FIG. 3 partly broken away.

FIGS. 3 and 4 depict a good way of using the material of FIG. 1 in refrigerators, cryogenic containers, and the passenger compartments of vehicles and aircraft. The material is bonded to the walls or panels of the object in question by strips of a suitable foam adhesive. The adhesive is applied in narrow bands overlying the stitching; parallel stitching in one direction only is best for insulating materials in such installations. The foam strips mask the perforations and build up the "R" factor along the stitched bands to limit heat transfer by conduction.

I claim:

1. A thermal insulating material comprising at least two sheets of polymeric film, a mesh sandwiched between each adjacent pair of film sheets, an outer mesh on each outside face of the film-mesh sandwich, rows of stitching joining the outer meshes and film-mesh sandwich and needle perforations through the film sheets to make the material vapor permeable including both perforations made by the needles which stitch the outer meshes and film-mesh sandwich together which are of a size of from about four to about seven diameters of the stitching thread and additional perforations made by non-threaded needles.

* * * * *

UNITED STATES PATENT AND TRADEMARK OFFICE
CERTIFICATE OF CORRECTION

PATENT NO. : 4,232,620
DATED : Nov. 11, 1980
INVENTOR(S) : Milton Kurz

It is certified that error appears in the above—identified patent and that said Letters Patent is hereby corrected as shown below:

On the cover page, the following Notice should appear:
--Notice: The portion of the term of this patent subsequent to October 28, 1997, has been disclaimed.--

Col. 1, line 52, "on the film," should read --on the film - , --
Col. 2, line 62, "te" should read --the--.
Col. 4, line 59, after "seven" insert --(not less than about four)--.

Signed and Sealed this

Twenty-first Day of April 1981

[SEAL]

Attest:

RENE D. TEGTMEYER

Attesting Officer

Acting Commissioner of Patents and Trademarks